J. H. CRUMB.
CAR DOOR.
APPLICATION FILED JAN. 28, 1915.
1,218,377.
Patented Mar. 6, 1917.
2 SHEETS—SHEET 1.
Fig. 1
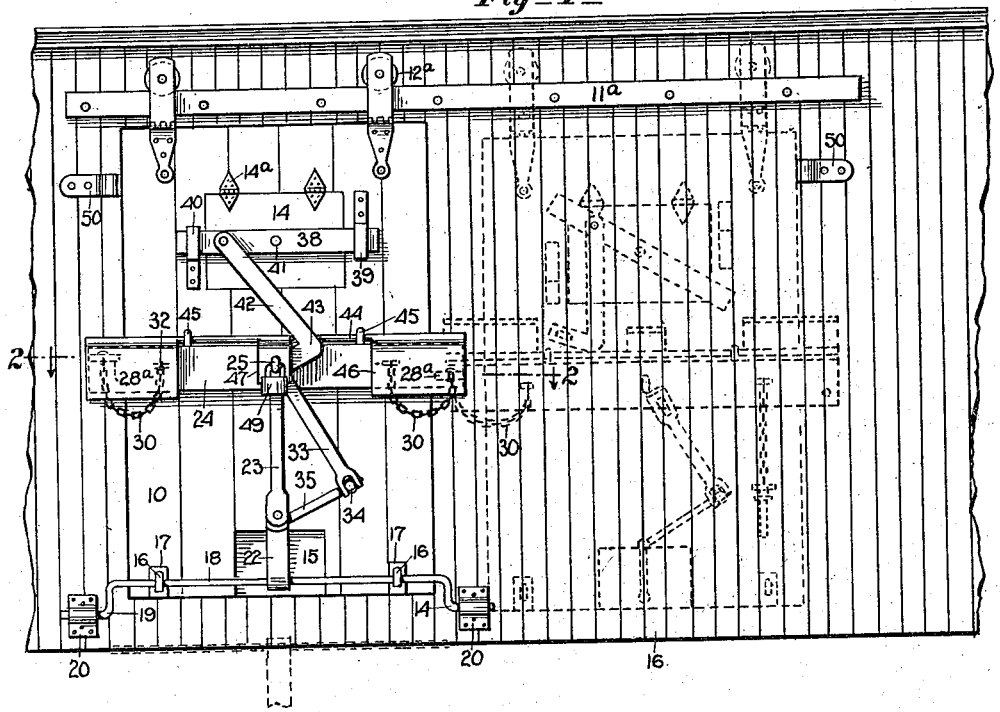
Fig. 2
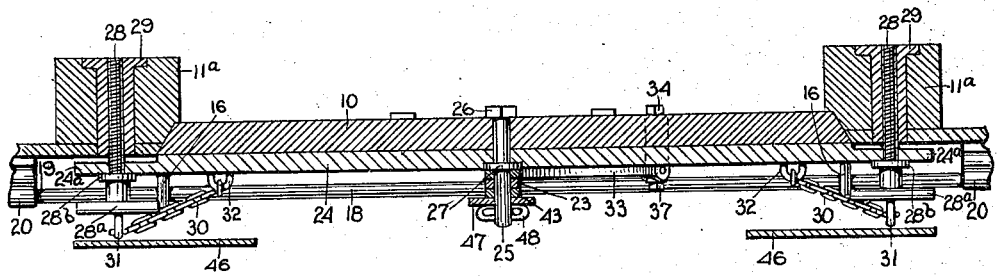
Fig. 5
WITNESSES
Frank C. Palmer
INVENTOR
John H. Crumb
BY
ATTORNEYS

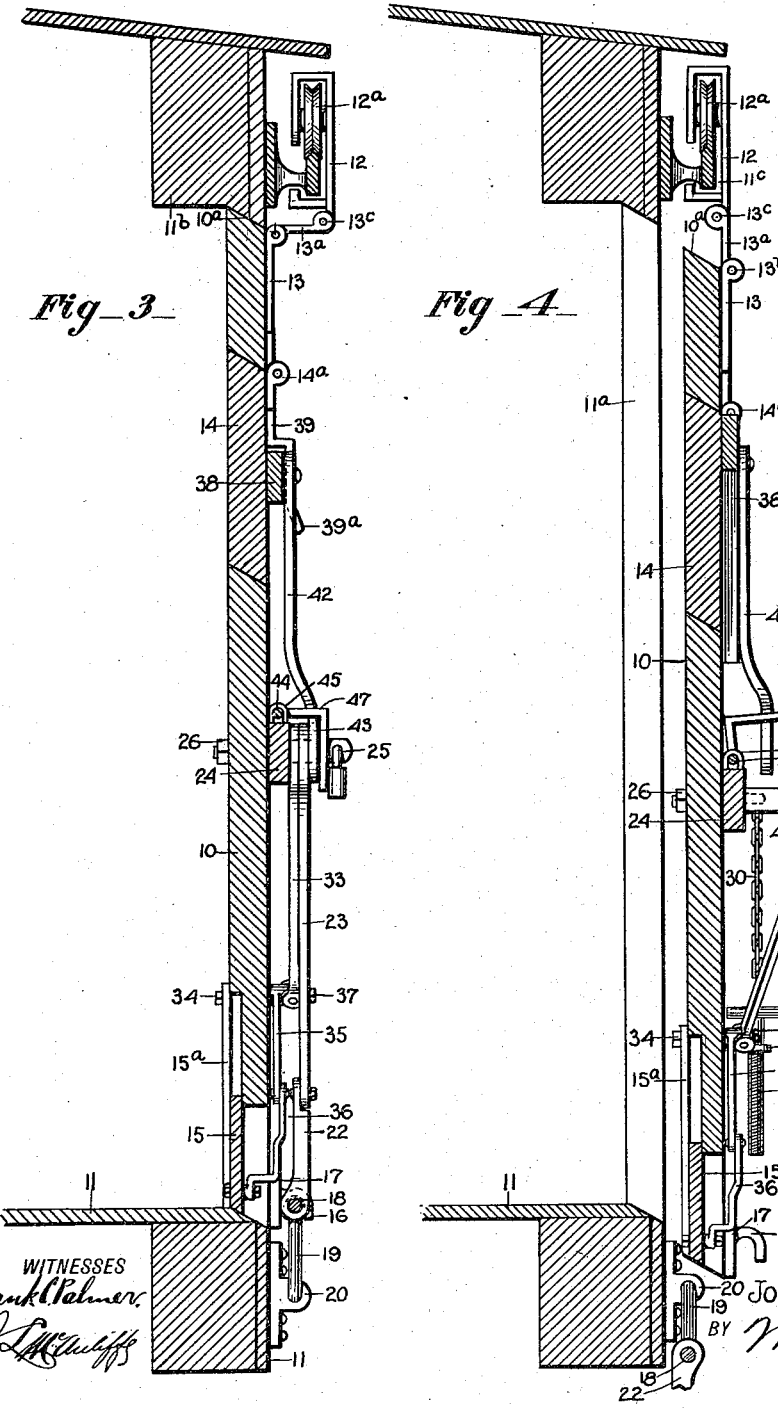

UNITED STATES PATENT OFFICE.

JOHN H. CRUMB, OF PLATTE, SOUTH DAKOTA.

CAR-DOOR.

1,218,377.   Specification of Letters Patent.   Patented Mar. 6, 1917.

Application filed January 28, 1915. Serial No. 4,875.

*To all whom it may concern:*

Be it known that I, JOHN H. CRUMB, a citizen of the United States, and a resident of Platte, in the county of Charles Mix and State of South Dakota, have invented a new and Improved Car-Door, of which the following is a full, clear, and exact description.

Objects of the invention are to provide a car door in the use of which extra timber now employed in connection with car doors, will be dispensed with, thereby cheapening and simplifying the structure; to provide a car door so formed and mounted as to be clamped, when closed, solidly in place, to constitute in effect a continuation of the side of the car, thereby making unnecessary the employment of extra grain doors or linings when loading grain or other material in bulk; and to provide a car door so mounted that it will not be clogged by ice or snow, and may be slid with facility without binding or jamming regardless of any bulging of the car.

Other objects and advantages of the invention will appear from the following description.

Reference is had to the accompanying drawings forming part of this specification, in which similar characters of reference indicate corresponding parts in all the views, and in which:

Figure 1 is a front elevation of a car door embodying my invention, showing the same in closed position on a car;

Fig. 2 is a horizontal section on a larger scale taken on the line 2—2, Fig. 1;

Fig. 3 is a transverse vertical section taken through the door in the closed position;

Fig. 4 is a similar view showing the door open; and

Fig. 5 is a fragmentary rear view showing the lower portion of the car door.

In constructing a practical embodiment of my invention in accordance with the illustrated example, the car door 10 is of the usual dimensions, and may be applied to any freight car 11 to be received in the door frame 11$^a$ beneath the top 11$^b$ of the door frame. The door 10 toward its upper end is beveled as at 10$^a$ to fit behind the correspondingly beveled surface in the door frame. From a comparison of Figs. 3 and 4 it will be seen that the door in the closed position is practically a continuation of the side of the car, and therefore no inner lining will be required or extra grain doors at the inside when bulk material is handled.

In order that the car door may be swung outwardly clear of the side of the car, the door is suspended by a double jointed hinge. Thus hangers 12 of any approved form have wheels 12$^a$ to run on a track rail 11$^c$ suitably secured to the car above the door-way. Hinge straps 13 are secured to the door and strap links 13$^a$ are pivoted as at 13$^b$ to said straps 13 and pivoted to the lower ends of the hangers 12 as at 13$^c$. Thus in the open position of the door it will hang in a position spaced from the side of the car.

To provide for spouting the grain into the car and for affording entrance to the car for trimming the load, an auxiliary door 14 is fitted in an opening near the upper portion of the door 10 and is hung by strap hinges 14$^a$ or equivalent means. At the bottom of the door 10 a second auxiliary door 15 is provided and operated in a manner hereinafter described, said door 15 serving to draw off grain when starting to unload.

On the car door near the lower edge downwardly disposed hooks 16 are provided near each side, suitably secured to the door as by base flanges 17. The hooks 16 are adapted to be engaged by a cranked locking bar 18, the offset crank ends 19 whereof turn in strap bearings 20 secured to the side of the car below the door-way. On the locking bar 18 is fixed a lever 22, the upper end 23 of which may be pivoted as shown, to be turned to different angular positions in the plane of the lever, to offer less obstruction when the door is open. The upper end of lever member 23 is adapted to be fastened on to a pin or bolt 25. The bolt 25 secures on the door 10 a transverse clamp bar 24, the bolt projecting beyond said clamp bar at the front to receive the fastener arm 23 and other arms hereinafter referred to. In the form shown the bolt 25 receives a nut 26 at the inside of the door and has a collar 27 in front of the clamp bar 24 whereby to effectively hold the latter to the door.

In the closed position of the door the bar 24 is clamped by bolts 28 which are received in nuts or threaded bushings 29 in the door frame of the car. The ends 24$^a$ of the bar 24 are rabbeted or given reduced thickness so that the direct pressure of the bolts will be exerted on the door and not against the door frame. In the form shown the bolts 28 have T-heads 28$^a$ for turning the same and shoulders or collars at 28$^b$ to engage the reduced ends 24$^a$ of the clamp bar 24. Chains 30 are connected with eyes 31 on the outer ends of the bolts 28 and to eyes 32 on the clamp bar 24 to carry the bolts when they are unscrewed from nuts 29. It will be observed from Fig. 1 that the bolt 28 at the right of the bar 24 is lower than the bolt 28$^a$ at the left, the nuts 29 being correspondingly positioned. By this arrangement, when the door is closed, the bolts may be engaged with the respective nuts 29, but in the open position of the door, indicated in dotted lines, Fig. 1, the left hand bolt 28 will be in position to engage the nut 29, at the right, because of the lower position occupied by the clamp bar 24 as the door drops by reason of the double jointed hinge.

It is to be observed that there is a particular correlation between the bolts and nuts, 28, 29, and the crank rod and hooks, 18, 16, since the said bolts and nuts are brought into line for engagement, only by a movement of the door following the swinging of the rod 18 into engagement with the hooks 16. Thus, the final tightening up of the door, by the bolts 28 and the nuts 29, follows and is secondary to the positioning of the door by a movement of the bar 18.

The pin 25 also receives and serves to lock the operating means for the lower auxiliary door 15. Thus an arm 33 is pivoted to a bolt 34 and the upper end of said arm is adapted to pass over said bolt 25. On the bolt 34 is a crank arm 35 secured by a nut 37, or the like, and the opposite end of said crank arm is secured to a link 36 connected with the door 15. Thus the arm 33 serves to raise and lower an auxiliary door 15, and in the closed position the said arm 33 is received at its upper end on the pin 25. The auxiliary door 15 has sliding movement in guides 15$^a$.

In order to fasten the upper auxiliary door 14, a cross bar 38 is applied thereto, and is adapted to be received at its opposite end in keeper members 39, 40, on the car door 10 at opposite sides of the door 14, the said bar 38 being pivoted at the center to the door 14 as at 41. Pivoted at its upper end to the bar 38 is a fastener bar 42, the bent end 43 of which is adapted to be passed on to the pin 25.

In order to guard the bolts 28 against tampering when the car door is locked, I provide covering means therefor. Thus a rocker bar 44 ranging lengthwise with the clamp bar 24 is adapted to turn in staples 45, on said clamp bar and on said rocker bar 44, plates 46 are secured to rock with the said bar 44 to a position over the bolts 28 as indicated in Figs. 1, 2 and 3, or to a raised position as in Fig. 4. There is also provided central on the rocker bar 44 a hasp 47 adapted to pass over the outer end of the pin 25 outside of the respective arms 23, 33, 43. An eye 48 in the outer end of the pin 25 may receive a suitable lock 49 after the hasp 47 is in position on said pin. Thus the lock will prevent any of the arms 23, 33 or 43, as well as the cover plates 46, from being moved, and thereby tampering with the door will be prevented.

Any suitable stops 50 may be provided on the car to limit the sliding movements of the door 10.

Having thus described my invention, what I claim as new and desire to secure by Letters Patent, is:

1. The combination with a car having a door-way, of a slidable door for said doorway, bolts on the door at each side adapted to engage the car, and a rockable element on the door, said element having plates adapted to overlie said bolts, and having a hasp, the said door having means to be engaged by said hasp.

2. The combination with a car having a door-way, of a door, slidably mounted door hangers, the door being connected with said hangers to swing transversely and to rise and fall in swinging, bolts on the door at each side, and nuts on the car to receive the said bolts, the said bolts and nuts at one side being lower than those at the opposite side so that the bolt at one side may engage the nut of the other bolt when the door is slid to the open position.

3. The combination with a car having a doorway, of a door mounted to slide and to have a vertical and transverse swinging movement relatively to the doorway, a cross bar on the door and projecting beyond the side edges thereof, the projecting ends having bolt holes, said ends overlapping the sides of the car when the door is in position in the doorway, timbers in the interior of the car at the doorway, nuts in said timbers, bolts adapted to be passed through the bolt holes in the bar to engage said nuts, the end portions of the bar being in a plane outward from the inner face of the door so that the said projecting ends have clearance to prevent contact with the car while the door is forced to a firm seat in the doorway by the engagement of the bolts and nuts, and co-acting means on the car and on the door at the bottom and operable to raise said door and position the same with the bolt holes of the bar in register with the said nuts.

In testimony whereof I have signed my name to this specification in the presence of two subscribing witnesses.

JOHN H. CRUMB.

Witnesses:
GEORGE F. RAUCH,
F. R. SMITH.

Copies of this patent may be obtained for five cents each, by addressing the "Commissioner of Patents, Washington, D. C."